(12) United States Patent
Khan (10) Patent No.: US 6,287,619 B1
(45) Date of Patent: Sep. 11, 2001

(54) IMPLEMENTS FOR USE IN PREPARING SLICED FOOD PRODUCTS

(75) Inventor: Shahid Khan, Plano, TX (US)

(73) Assignee: Tricon Restaurants International, Dallas, TX (US)

( * ) Notice: Subject to any disclaimer, the term of this patent is extended or adjusted under 35 U.S.C. 154(b) by 0 days.

(21) Appl. No.: 09/256,242

(22) Filed: Feb. 23, 1999

Related U.S. Application Data (60) Provisional application No. 60/075,660, filed on Feb. 23, 1998.

(51) Int. Cl.$^7$ ............................... A45C 11/20; A47J 37/10
(52) U.S. Cl. ............................... 426/523; 99/422; 99/426; 99/DIG. 15; 206/551
(58) Field of Search ............................... 99/DIG. 15, 422, 99/426; D7/354, 359, 363, 610; 426/523; 206/551, 541

(56) References Cited

U.S. PATENT DOCUMENTS

| | | | |
|---|---|---|---|
| D. 30,435 | * | 3/1899 | Bradley . |
| D. 168,462 | * | 12/1952 | Krilow ................... D44/15 |
| D. 169,004 | * | 3/1953 | Krilow ................... D44/15 |
| D. 195,524 | * | 6/1963 | Patton, Jr. ............... D44/15 |
| D. 206,279 | | 11/1966 | Palmer ................... D44/29 |
| D. 243,380 | * | 2/1977 | Berger .................... D7/85 |
| D. 297,297 | | 8/1988 | Lacey .................... D7/354 |
| D. 336,589 | * | 6/1993 | Schindler ............... D7/539 |
| 348,839 | | 9/1886 | Grosz . |
| D. 391,808 | * | 3/1998 | Voege .................... D7/629 |
| D. 419,364 | * | 1/2000 | Jarvis .................... D7/354 |
| 731,417 | | 6/1903 | Thorne . |
| 1,021,640 | | 3/1912 | Steitler . |
| 1,290,186 | | 1/1919 | Held . |
| 1,526,397 | * | 2/1925 | Thornton . |
| 1,587,288 | * | 6/1926 | Dooly . |
| 1,613,223 | | 1/1927 | Davis . |
| 1,647,186 | | 11/1927 | Miles et al. . |
| 2,327,988 | | 8/1943 | Bassett ..................... 53/6 |
| 2,452,969 | | 11/1948 | Victor ..................... 206/4 |
| 2,716,066 | * | 8/1955 | Baker ..................... 99/234 |
| 3,132,423 | | 5/1964 | De Lano ................. 30/114 |
| 3,815,736 | * | 6/1974 | Sedlak ................... 206/501 |
| 4,773,320 | * | 9/1988 | Stock et al. ............. 99/449 |
| 5,074,777 | | 12/1991 | Garner ................... 429/289 |
| 5,680,956 | * | 10/1997 | Woodward et al. ..... 220/607 |

\* cited by examiner

*Primary Examiner*—Keith Hendricks
*Assistant Examiner*—Drew Becker
(74) *Attorney, Agent, or Firm*—Dicke, Billig & Czaja, P.A.

(57) ABSTRACT

A pan for baking e.g. single-serving-sized food product is adapted to promote substantially even heat distribution, to shield the food product from excessive browning and crisping, and to substantially prevent burning. The pan accomplishes these functions by utilizing one or more structural features, including, for example, perforations, sloped, variable-height walls and a sloped arcuate rim. Embodiments of the invention may be used in combination with a separator to stack and store food product in a heated or cooled receptacle, and in combination with a slicing/topping guide.

21 Claims, 6 Drawing Sheets

Fig. 12 though other pans known in the art may be used. (FIG. 13 of the Garner patent, for example, shows a pan divided by a divider into six substantially pie-shaped sections.) -->

IMPLEMENTS FOR USE IN PREPARING SLICED FOOD PRODUCTS

CROSS-REFERENCE TO RELATED APPLICATION

The subject matter of this application is related to the subject matter of provisional patent application Ser. No. 60/075,660, filed Feb. 23, 1998, which is incorporated herein by reference and priority to which is claimed under 35 U.S.C. § 119(e).

BACKGROUND OF THE INVENTION

1. Field of the Invention

The invention relates to implements for use in preparing sliced food products, and more particularly, according to embodiments of the invention, for use in preparing products having a dough base and at least one topping disposed over the dough base. Embodiments of the invention especially apply to pizza slices for retail sale.

2. Description of Related Art

Pizza products enjoy tremendous popularity throughout the world. Pizza restaurants and others commonly sell single slices of pizza, instead of entire pizza pies, to customers who have e.g. limited time or for other reasons do not wish to purchase a pizza product of substantial size.

To create individual slices for retail sale, restaurants typically prepare and bake an entire pizza pie and then cut it into a desired number of individual portions. This presents a number of disadvantages, however. Following this process can waste a substantial amount of food, given the short shelf life of baked pizza products in a commercial sale environment. This process can also result in non-uniform distribution of cheese and toppings on the individual slices, or non-uniformity from slice to slice. Additionally, the substantial mass of an entire pizza pie can adversely affect various baking parameters associated with the single-slice environment, e.g. it can lengthen the baking time required adequately to heat the center of the pie. Other disadvantages will be readily apparent to those of ordinary skill in the art.

Attempts to bake pizza slices individually generally have met with difficulty. Overbaking, excessive browning, hardening, or even burning of individually baked slices are common, especially on the sides of the slice. Placing toppings, cheese and/or tomato sauce on individual slices is also somewhat difficult, given e.g. the relatively small slice sizes desirable for commercial sale.

Although various triangular or triangularly sectioned pans or containers are known in the art (see, e.g., U.S. Pat. Nos. 2,452,969, 1,021,640, and 348,839), none of them adequately overcomes the disadvantages noted above in a baking environment. For the first time, the slice pan embodiments of the invention shown and described herein provide significant advantages not known or contemplated in the prior art.

One type of guide apparatus for preparing pie slices is shown in U.S. Pat. No. 5,074,777 to Garner, which is incorporated herein by reference. This patent discloses an apparatus for making a split pie, including a dividing assembly to be inserted into a pie pan for separating a pie into sections, each section having a distinct pie filling. The FIG. 13 embodiment is used for making pre-sliced and divided pizza pies. This embodiment can be used to divide and slice a pizza pie into six equal and distinct portions, allowing a different and distinct topping or combination of toppings to be placed onto each portion before the pizza is baked. If six different people want six different toppings, for example, six toppings can be easily applied to the different slices. The divider also ensures that the various pizza toppings do not overflow or run onto adjacent slices. Finally, the sides of the divider are tapered to conform to the shape of the corresponding pan (column 12, lines 32–35).

The Garner embodiments, however, are of significant structural and manufacturing complexity and are believed prohibitively expensive for use on a large scale. The FIG. 13 embodiment, for example, includes upper and lower eyelet-forming means disposed in a central blade 147, as well as eyelet-forming means on additional, separate blades 151, 153. A pivotal connection between first and second rigid V-shaped adjustable members is provided, the members being movable to create sliced sections of unequal dimensions. Mere use of the Garner embodiments in e.g. chain restaurants also would be problematic, as product uniformity would be difficult if not impossible to achieve from restaurant to restaurant, or even from pizza to pizza and slice to slice.

Embodiments of the invention, on the other hand, provide significant advantages while overcoming the above-described and other disadvantages, as will now be described.

BRIEF DESCRIPTION OF THE DRAWINGS

Embodiments of the invention will be described with reference to the figures, in which like reference numerals denote like elements and in which.

DESCRIPTION OF PREFERRED EMBODIMENTS

Embodiments of the invention relate primarily to pizza pies and pizza slices, and the implements used in preparing and baking these products. The invention relates to a wide variety of food products, however, mainly those intended for division into a number of portions or slices, e.g. dessert pies, cakes, other baked goods, etc. Therefore, although primary embodiments of the invention will be described with respect to pizza and pizza slices, the invention is by no means limited to such embodiments.

Slice Pan

Slice pan embodiments of the invention are illustrated in FIGS. 1–4. Slice pan 10 includes base 20 preferably having multiple perforations 25, two substantially straight-edged sidewalls 30 bordering base 20, and substantially curvededged sidewall or rim 40 bordering base 20 and defining preferably an arc between substantially straight-edged sidewalls 30. Sidewalls 30 are connected to base 20, to each other at the tip of the pan, and to rim 40 by tack welding, according to one embodiment, but of course a number of different connection schemes are contemplated, including integral molding or stamping which likely provide the best manufacturing and cost advantages. When molding/stamping is not possible, tack welding has been found advantageous over continuous welding to avoid damage to any coating on the pan. Rim 40 preferably is one-piece with base 20 and is formed e.g. by bending the sheet of material forming base 20 upwardly at a desired angle, e.g. about 52 degrees from the plane of base 20. Of course, rim 40 also can be a separate piece originally and welded or otherwise secured to base 20. Rim 40 and base 20 together comprise means for receiving and supporting a food product.

Straight-edged sidewalls 30 define a first height 50 at apex 55 of pan 10, and define a second height 60 at the ends of sidewalls 30 opposite apex 55. Heights 50, 60 are defined between the top edge of the respective sidewall 30 and the plane of contact between pan 10 and the surface on which it rests. According to preferred embodiments, height 50 is greater than height 60, such that sidewalls 30 have a greater elevation at apex 55, i.e. at the tip of the slice to be contained within pan 10, than at the arcuate rim 40. According to one specific embodiment, the height of sidewalls 30 is about 3.0 centimeters at tip 55 and about 2.5 centimeters at rim 40.

Figure 1:
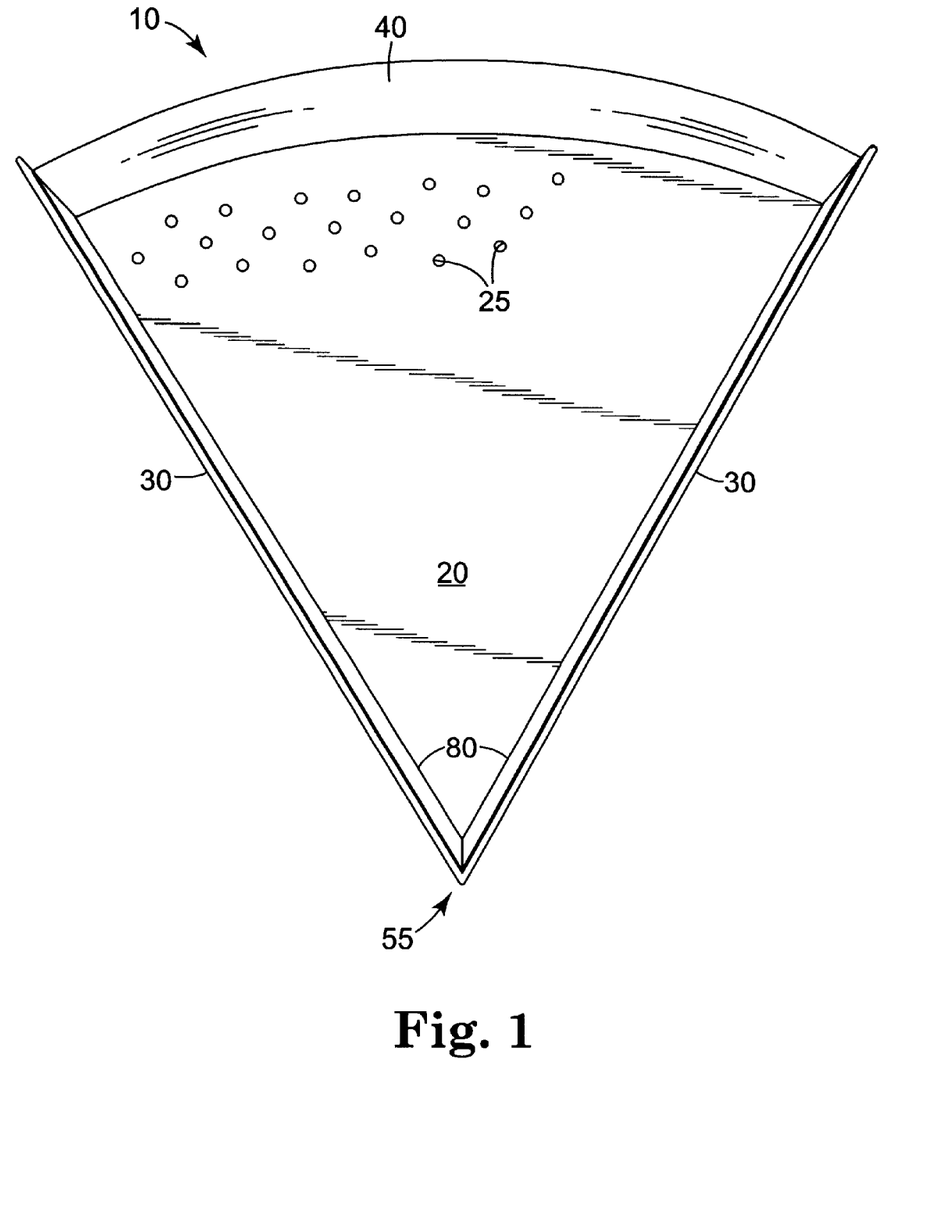
FIG. 1 is a top view of a slice pan according to an embodiment of the invention.
Figure 2:
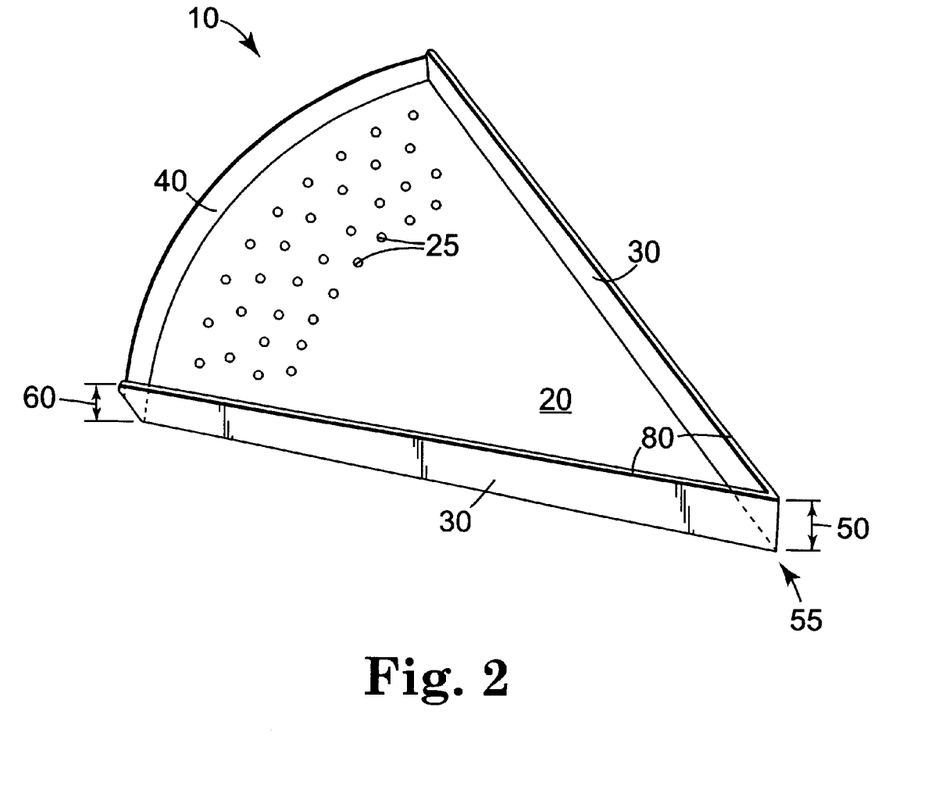
FIG. 2 is a perspective view of a slice pan according to an embodiment of the invention.
Figure 3:
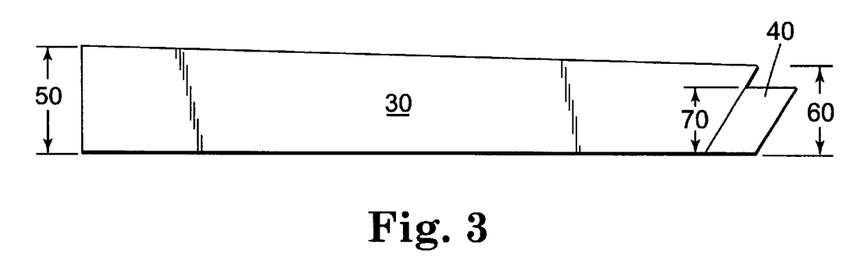
FIG. 3 is a side view of a slice pan according to an embodiment of the invention.
Figure 4:
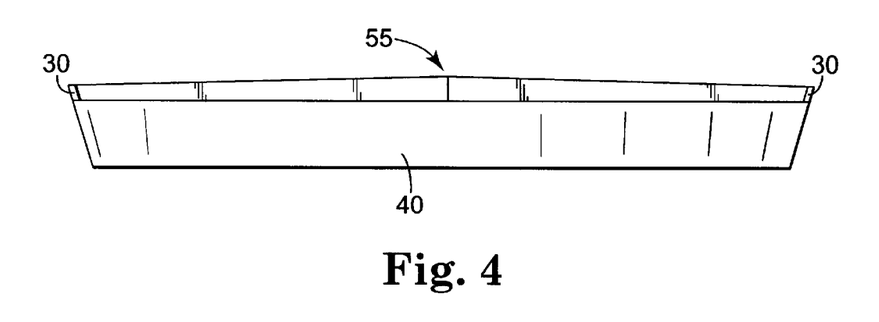
FIG. 4 is rear view of a slice pan according to an embodiment of the invention.

As shown in FIG. 3, rim 40 defines a height 70 with respect to the plane of contact between the bottom of pan 10 and its underlying surface. According to preferred embodiments, rim height 70 is less than sidewall height 60, and according to one specific embodiment, rim height 70 is about 2.0 centimeters. Base 20 and rim 40 can be formed from sectors of a full pizza pan of the type primarily disclosed in commonly assigned U.S. Pat. No. 5,680,956, issued Oct. 28, 1997, which is incorporated by reference herein. Base 20 can also be of substantially constant perforation density, and is so according to primary embodiments of the invention.

Sidewalls 30, which comprise means for shielding the sides of and which may serve to contain the food product, define an included angle 80, which can vary depending on the size of slice desired. Angle 80 can range from a few degrees to near a full circle. Angle 80 can be defined as (360°/N), where N is the number of slices that would be obtained from a full pizza pie having a radius equal to the length of sidewalls 30. In other words, if N =6, angle 80 is about 60 degrees and the size of slice accommodated in pan 10 is roughly equal to that which would be obtained if a like-sized full pizza pie were cut into six slices. Additionally, pan 10 can easily accommodate a slice that already has been prepared by dividing a pie into six pieces, e.g. for re-warming purposes or in a par-baking application. According to preferred embodiments, however, as will now be described, slices are individually prepared and baked within pan 10 originally.

Slice pan embodiments according to the invention have been developed to enable cooking of individual slices in a very short period of time while maintaining high product quality. The slope of sidewalls 30 toward apex 55, for example, provides better support for a fully topped slice within pan 10 and also serves better to retain the toppings in place, i.e. eliminate their loss from the slice, during e.g. assembly of the slice or transfer of the slice from pan 10. Sidewalls 30 protect the sides, corners and edges of the slice from excessive heat accumulation and excessive, undesirable browning/crisping or burning there.

Sidewalls 30 also preferably are sloped slightly outwardly relative to base 20, to facilitate transfer of product from the pan. (Of course, a right-angle intersection between base 20 and sidewalls 30 is also contemplated.) Further, the reduced elevation of rim 40 relative to sidewalls 30 also facilitate transfer, e.g. by more easily allowing placement of a spatula or other utensil under the slice. Finally, sidewalls 30 can provide a guide for the topping process, assuring that toppings are placed accurately as the pizza slice is assembled.

Slice pan 10 can be used to hold finished pizza-slice products in hot storage, e.g. in a heated holding cabinet. To this end, pan 10 can be elevated above its underlying surface, according to one embodiment, e.g. by three legs or equivalent structure attached to base 20. This improves air circulation and heat exposure to the bottom of the slice, providing more uniform heat transfer and allowing the temperature of the product to be maintained at a higher level for a longer period of time. Other advantages associated with base 10, and perforations 25 of base 10, are discussed in the above-referenced commonly assigned U.S. patent.

Further embodiments of the invention include a non-stick coating on the sides of the pan, to further ease transfer of the slice. Although the illustrated slice pan embodiments are designed to correspond to a six-slice pie, pans according to the invention can be formed to accommodate slices of any cut, diameter, thickness, or shape. In some embodiments, it may be preferable to leave base 10 unperforated or, alternatively or additionally, to provide perforations in sidewalls 30 and/or rim 40.

According to preferred embodiments, slice pan 10 is constructed of a metal such as aluminum, and is provided with a non-stick coating. Such embodiments provide rapid thermal conduction and quick heat-up and cool-down. A wide variety of materials are contemplated, however, depending e.g. at least in part on the environment for which the pan is intended. Wear-resistant materials are especially desirable, given the frequent contact of pan 10 with e.g. steel spatulas and the like.

Thus, slice pan 10 according to the invention provides significant advantages, and does so throughout the entire life of the pizza slice, e.g. during topping, baking, storing, hot-holding and ultimate transfer.

Pan Separator

In many instances, it is desirable to stack slice pans according to the above embodiments together, e.g. in a cooler, a heated holding cabinet, or other environment. The preferred outward angling of sidewalls 30 with respect to base 20, however, such that pan 10 is of greater circumferential dimension at its top edge than at base 20, makes stacking difficult without nesting vertically adjacent pans into each other and potentially damaging a held slice. Additionally, the differing heights 50, 60 of sidewalls 30, at their opposite ends, contribute to the difficulty in stacking. Therefore, embodiments of the invention include pan separator 100, illustrated in FIGS. 5–7.

Figure 5:
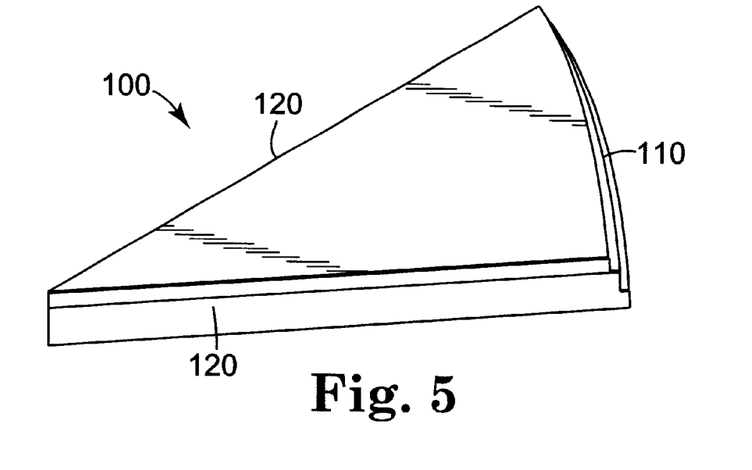
FIG. 5 is a perspective view of a separator for a slice pan according to an embodiment of the invention.
Figure 6:
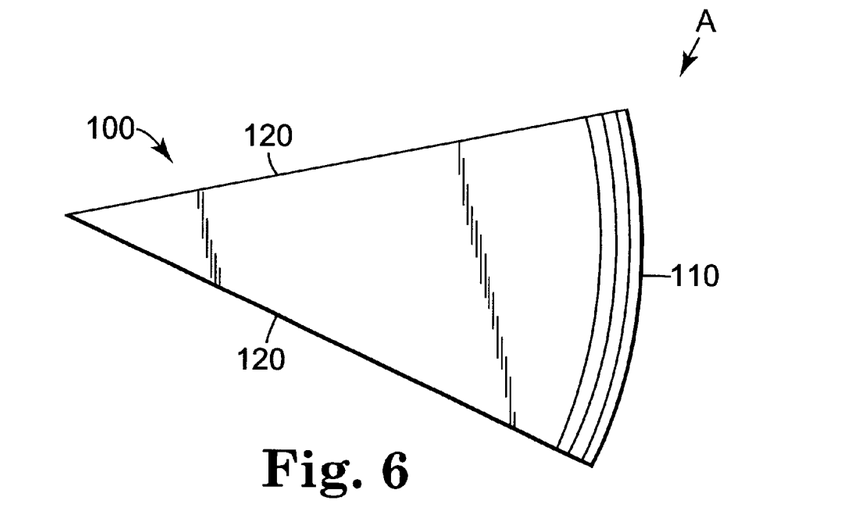
FIG. 6 is a plan view of the FIG. 5 separator.

Pan separator 100 is intended to be placed between vertically adjacent slice pans 10 and to compensate for the stacking difficulties outlined above. Separator 100 includes side panels 120 and stepped rim 110, best shown in FIG. 7, with rim 110 constructed to engage the top of one rim 40 at 112, to engage a portion of sidewalls 30 at 114, and to support the bottom surface of a vertically adjacent pan 10 at floor 116. Toppings and crust are thus positioned within and covered by pan separator 100 at 118, as shown. According to one embodiment, separator 100 can take the form of a sector of the pan separator disclosed in U.S. Pat. No. D297,297, which is incorporated herein by reference.

Figure 7:
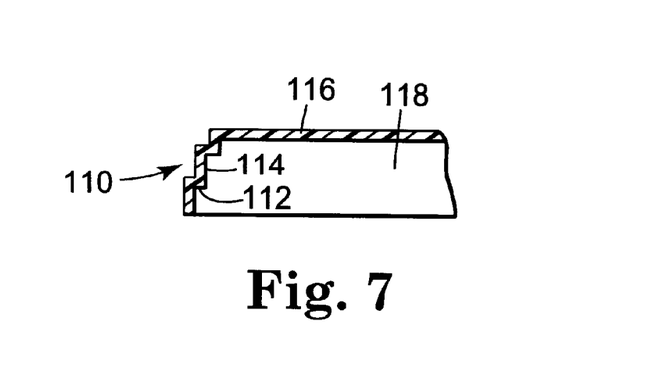
FIG. 7 is a cross-sectional view taken at A in FIG. 6.

According to preferred embodiments, separator 100 is constructed of a plastic material. A wide variety of materials are contemplated, however, depending e.g. at least in part on the environment for which the separator is intended. TEFLON and metals or metal alloys also are contemplated, for example.

Topping and Baking Guide

According to embodiments of the invention, topping and baking guide 200 is provided and is described herein with reference to FIGS. 8–12. As shown in the FIG. 8 embodiment, topping guide 200 includes six guide arms 210 that are preferably in substantially fixed positional relationship to each other, e.g. by welding at their central intersection. Guide arms 210 preferably are disposed to form substantially equally sized slices of food product, but of course can be configured to provide slices of any desired size or shape. Additionally, guide 200 is constructed for insertion into a pizza pan or the like.

Figure 8:
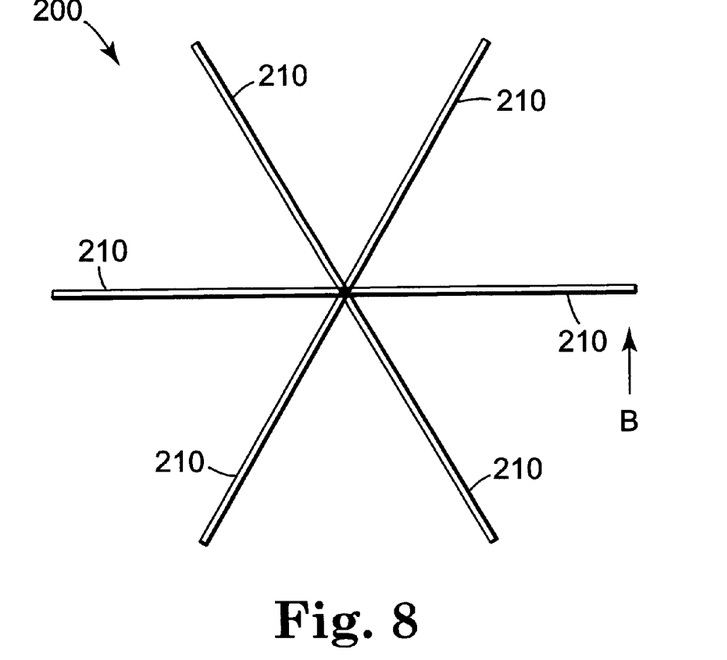
FIG. 8 is a plan view of a topping/baking guide according to an embodiment of the invention.
Figure 9:
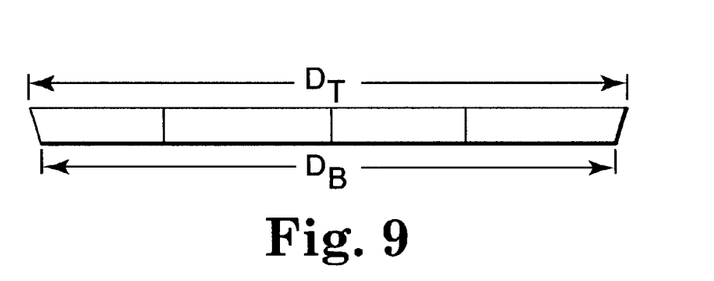
FIG. 9 is a side view of the FIG. 8 guide.
Figure 10:
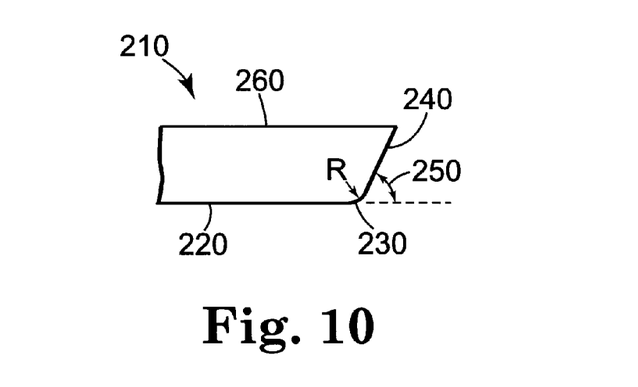
FIG. 10 is a side view taken at B in FIG. 8.

As shown in FIG. 10, the outer portion of bottom edge 220 of each guide arm 210 includes a curved portion 230 having a radius of curvature R. Outer edge 240 of each guide arm 210 defines an angle 250 with respect to bottom edge 220. According to one particular embodiment, radius of curvature R is about 0.250±0.30 inches, preferably substantially matching that of the pan into which guide 200 is placed. Angle 250 is preferably about 60±20 degrees, and according to one particular embodiment is about 80 degrees, again preferably to match the pan into which guide 200 is placed. According to one embodiment, top edge 260 of each set of collinear guide arms 210 defines a diameter, $D_T$, of about 15 inches, and bottom edge 220 a diameter, $D_B$, of about 14.25 inches, substantially matching the top inner and bottom inner diameters of the corresponding pan. Note, for example, FIG. 9. Thus, the ends of guide arms 210 are angled and dimensioned to provide a good fit with the profile of the sides of the pan into which guide 200 is placed. Guide 200 preferably is about as high as the pan, e.g. to prevent toppings from falling off the slice. Of course, a wide variety of angular and linear dimensions, numbers of slices, and slice shapes are contemplated according to the invention.

According to preferred embodiments, guide 200 is constructed of a metal such as aluminum, and is provided with a non-stick coating. Such embodiments provide rapid thermal conduction and quick heat-up and cool-down. A wide variety of materials are contemplated, however, depending e.g. at least in part on the environment for which the guide is intended. Plastics, TEFLON, and metals or metal alloys besides aluminum also are contemplated. Wear-resistant materials are especially desirable, given the frequent contact of guide 200 with e.g. steel spatulas and the like.

Guide 200 performs a number of advantageous functions with a simplicity and ease of manufacture not believed known in the prior art. Guide 200 works as a heat sink when food product is baked with guide 200 in place, for example. This enables better heat transfer throughout the product due to the contact of guide arms 210 with both sides of the respective slices. Heat concentration is more effective in the center of the pie, which especially helps cooking of the thicker, denser and/or more voluminous food products such as certain types of specialty pizza. Guide 200 also protects the sides of the slices from overbrowning and/or becoming too crisp.

Additionally, guide arms 210 facilitate equal distribution of pepperoni or other toppings over all six (or other desired number) of slices in the pizza pie or other food product. This enables a full pie to be topped instead of individual slices out of the pie, yet assures even toppings distribution and thus enhanced flavor and appearance. Use of personal pan pizza scoops can be eliminated, which is beneficial since such scoops can slow down the topping process considerably. Transfer of the finished, baked product is also facilitated, as guide arms 210 substantially prevent toppings loss and also guide the spatula or other serving implement to its proper position. Further, guide arms 210 substantially eliminate the possibility of adjacent slices sticking together due e.g. to cheese melt and/or overflow of melted cheese from one slice to another.

By designing guide 200 for topping as well as for baking, multiple functionality is achieved at minimum cost and with considerable manufacturing simplicity, unlike many devices of the prior art.

In operation, according to one embodiment, a dough base is placed in an underlying pan, and then guide 200 is placed on top of the dough base. Bottom 220 of guide arms 210 can form a "cookie-cutter" or similar edge, to easily cut the underlying dough layer into pieces. Then, the pizza pie or other food product is topped, using guide 200 to evenly distribute toppings as described above. Alternatively, different toppings can be placed on different slices or subsets of slices to correspond to e.g. anticipated customer demand.

According to different operational embodiments, the dough base can be a par-baked dough base to reduce final baking times. The dough base can be sauced prior to inserting guide 200, or even cut into slices if desired. Saucing and/or topping the dough base can occur before or after guide 200 is placed on top of the dough base.

Figure 11:
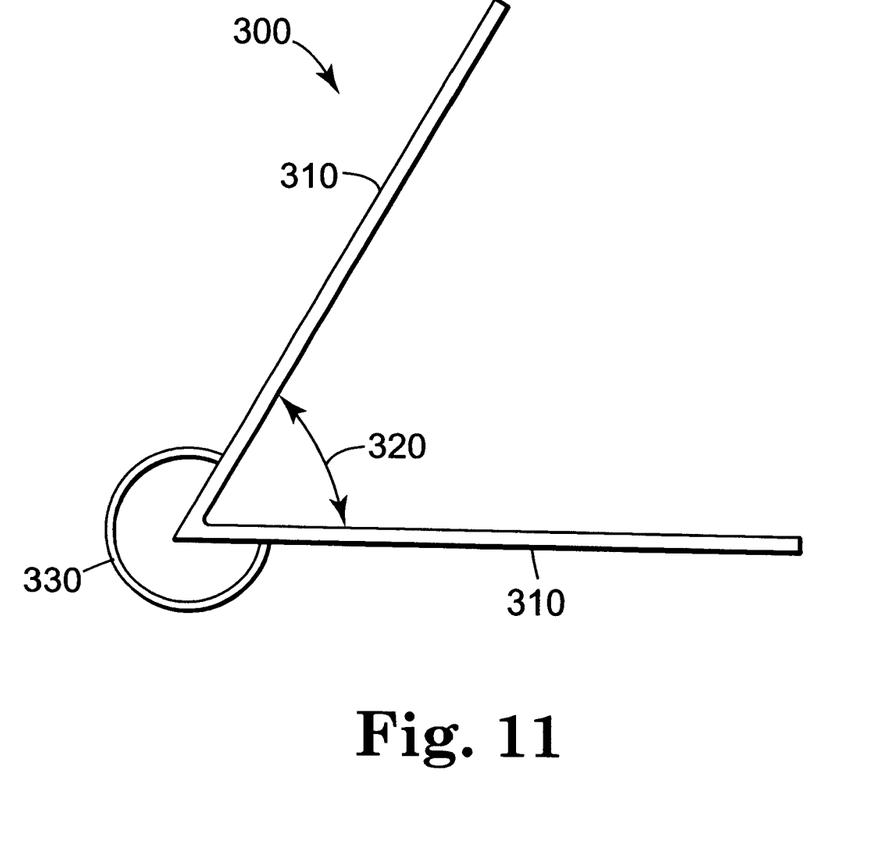
FIG. 11 is a plan view of a single-slice topping/baking guide according to an embodiment of the invention.
Figure 12:
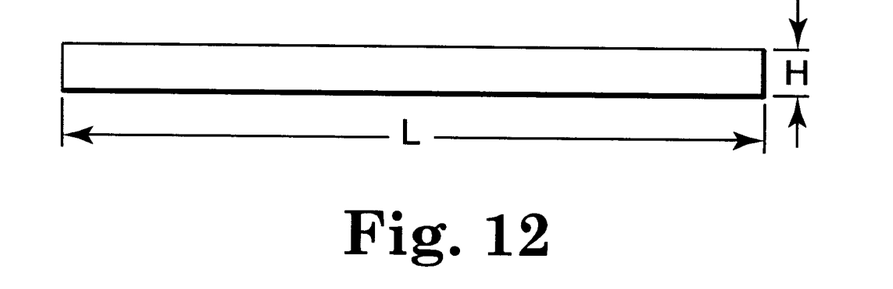
FIG. 12 is a side view of the FIG. 11 guide.

A single-slice guide embodiment is shown in FIGS. 11–12. Guide 300 includes two guide arms 310 separated by a desired angle 320, e.g. about 60 degrees depending on the desired slice size. Guide 300 also includes a biasing device 330, or piece of spring steel or other material, holding angle 320 substantially constant and/or "springing" guide arms 310 back to form an original angle 320 after arms 310 are accidentally (or otherwise) pushed open or closed. This substantially prevents guide 300 from becoming misshapen, which can cause the sides of the slice to e.g. sag and/or burn. According to one embodiment, arms 310 have a length, L, of about eight inches and a height, H, of about 1.5 inches.

While the invention has been described with reference to specific embodiments, the description is illustrative and is not to be construed as necessarily limiting the scope of the invention. For example, as mentioned throughout the specification, other types of food products advantageously can be baked using the pans, guides and separators disclosed herein, not just pizza-type products. The disclosed embodiments according to the invention also can be used in a wide variety of ovens, formed of a wide variety of materials, and can be of a wide range of shapes, sizes, and configurations. Further, various features of the different embodiments can be mixed and matched to suit a particular application. Various other modifications will be apparent to those of ordinary skill without departing from the sphere and the scope of the invention.

What is claimed is:

1. A pan for baking a food product in a baking oven, the pan comprising:

a generally planar base having a top surface to receive a food product, a bottom surface to rest upon a surface of the baking oven, and at least a pair of sides;

a pair of sidewalls extending along the sides of the base and meeting at an apex; and a substantially arcuate rim extending between the sidewalls;

wherein the pair of sidewalls each have a first height at an apex and a second height at an end opposite the apex and proximal the rim, further wherein the first height is greater than the second height, wherein the arcuate rim has a third height, the third height being less than the second height; and wherein the sidewalls intersect the plane of the base at an obtuse angle extending along the sides of the base.

2. The pan of claim 1, wherein the pair of sidewalls and the arcuate rim are connected by tack welding.

3. The pan of claim 1, wherein the base and the arcuate rim comprise a one-piece assembly.

4. The pan of claim 3, wherein the arcuate rim is disposed at an angle of about 52° from the plane of the base.

5. The pan of claim 1, wherein the base defines a plurality of perforations extending through the base to allow transmission of heat through the base.

6. The pan of claim 1, wherein the first height is about 3.0 centimeters and the second height is about 2.5 centimeters.

7. The pan of claim 6, wherein the third height is about 2.0 centimeters.

8. The pan of claim 1, wherein an angle formed between the sidewalls at the apex is about 60°.

9. The pan of claim 1, wherein the pan is constructed of aluminum.

10. A method of preparing a wedge-shaped food product for consumption, the method comprising:

placing the food product into the pan according to claim 1; and baking the food product in a baking oven.

11. The method of claim 10, further comprising:

retaining the pan in a heating unit;

allowing heat transmission through the base with a plurality of perforations extending through the base; and limiting excessive food-product crisping by providing sidewalls intersecting the plane of the base at an obtuse angle.

12. The pan of claim 1, in combination with a device for separating said pan from an adjacent, identical pan in a stack of pans, the device comprising:

a substantially planar floor having a first surface to cover a food product housed in a first stacked pan and a second surface to support a second stacked pan over the first stacked pan, the floor defining a wedge shape.

13. The combination of claim 12, the device further comprising:

a first side panel connected to the floor;

a second side panel connected to the floor and the first side panel; and a stepped rim connected to the floor and positioned between the first and second panels, the rim comprising a plurality of substantially vertical and horizontal surfaces disposed at about 90° angles relative to each other, wherein at least one horizontal surface and at least one vertical surface engage a surface of the baking pan.

14. The pan of claim 1, wherein each sidewall is non-vertical.

15. A pan for baking a food product, the pan comprising:

means for receiving and supporting a food product, the means for receiving and supporting comprising a generally planar base having a top surface, a bottom surface, and at least two sides, the means for receiving and supporting further comprising a substantially arcuate rim connected to the base; and means connected to the receiving and supporting means for shielding the sides of the food product from baking heat, the means for shielding comprising a pair of sidewalls extending along the sides of the base and meeting at an apex, the sidewalls each having first and second ends, each sidewall having a first height at the first end thereof and a second height at the second end thereof, the first height being greater than the second height;

wherein the rim extends between the sidewalls, the rim having a height, said rim height being less than the second height of each sidewall, wherein the arcuate rim is disposed at an obtuse angle relative to the base.

16. The pan of claim 15, wherein the base comprises a generally pie-wedge shape, the base further comprising a plurality of apertures adapted for transmission of baking heat through the base.

17. The pan of claim 16, wherein the sidewalls meet at an apex.

18. The pan of claim 15, wherein the rim is permanently attached to the base and contacts each sidewall at a point of contact, the second height of each sidewall being at the point of contact, such that the height of the rim at the point of contact is less than the second height of each sidewall.

19. A pan for baking a food product in a baking oven, the pan comprising:

a generally planar base having a top surface to receive a food product, a bottom surface to rest upon a surface of the baking oven, and at least a pair of sides;

a pair of generally planar, intersecting sidewalls extending along the sides of the base, the sidewalls having a height; and a substantially arcuate rim permanently attached to and extending upwardly from an edge of the base, the rim extending between the sidewalls and contacting each sidewall at a point of contact, the rim having a height less than the height of the sidewalls at least at the point of contact between the rim and each sidewall, wherein the sidewalls meet at an apex, the height of the sidewalls at the apex being greater than the height of the sidewalls at the rim.

20. The pan of claim 19, wherein the height of the rim is less than the height of the sidewalls.

21. In combination, a pan for baking a food product in a baking oven and a device for separating the pan from an adjacent, identical pan in a stack of pans, wherein the pan comprises:

a generally planar base having a top surface to receive a food product, a bottom surface to rest upon a surface of the baking oven, and at least a pair of sides;

a pair of sidewalls extending along the sides of the base and meeting at an apex, the sidewalls intersecting the plane of the base at an obtuse angle; and a substantially arcuate rim extending between the sidewalls, the pair of sidewalls each having a first height at an apex and a second height at an end opposite the apex and proximal the rim, the first height being greater than the second height wherein the height of the rim is less than the second height;

wherein the device comprises:

a substantially planar floor having a first surface to cover a food product housed in a first stacked pan and a second surface to support a second stacked pan over the first stacked pan, the floor defining a wedge shape.

* * * * *